Patented June 11, 1946

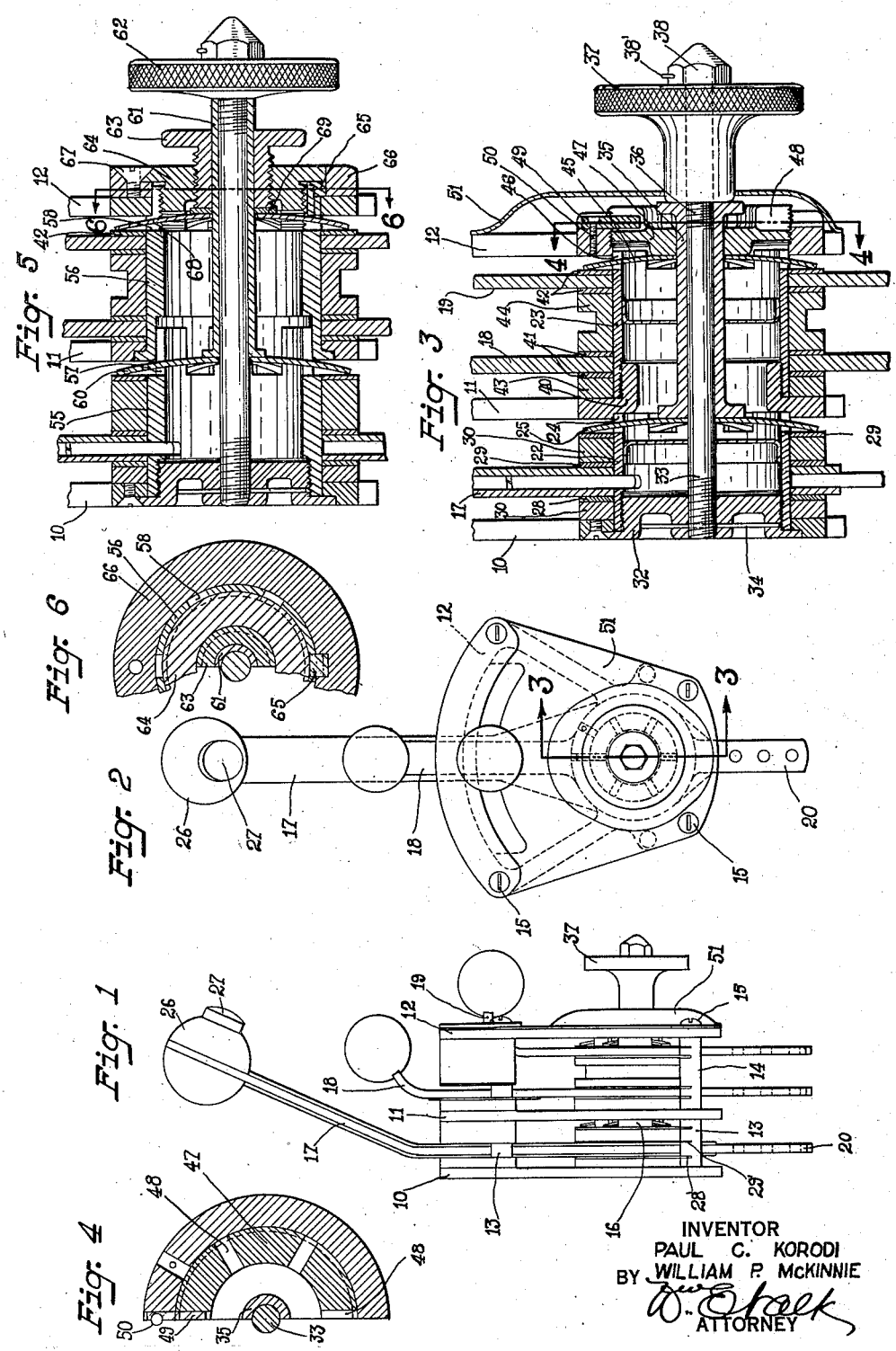

2,401,741

UNITED STATES PATENT OFFICE 2,401,741

CONTROL QUADRANT ASSEMBLY

Paul C. Korodi, Buffalo, and William P. McKinnie, Kenmore, N. Y., assignors to Curtiss-Wright Corporation, a corporation of Delaware Application March 22, 1943, Serial No. 480,122

14 Claims. (Cl. 74—531)

1

This invention relates to control quadrant assemblies and more particularly to means for varying the degree of frictional engagement of friction elements with the levers thereof.

Heretofore, adjustable means for varying the degree of frictional engagement of the friction elements with the levers has been common to the entire group of levers in the assembly, and no provision has been made whereby one of the levers could be given a different friction adjustment than the other levers. Often times it is desirable, when in flight and particularly in formation flying, that some adjustment be provided whereby the throttle can be more easily manipulated than it is necessary to manipulate the other levers, the other levers being moved from a set position less frequently than the throttle lever.

It is, therefore, an object of the present invention to provide a control quadrant assembly having frictional adjustment wherein one of the levers can be given a different degree of frictional adjustment than can other of the levers.

It is another object of the invention to provide a supporting frame for these control levers which is of simple construction and wherein separate and independent adjustable means can be accessible at one and the same side of the supporting frame.

According to the present invention, there has been provided a supporting frame made up of bulkheads in which is mounted a hollow hub means. Control levers are mounted on this hub means for pivotal adjustment and in engagement with each lever is a friction element slidable on the hub means for different degrees of frictional engagement with the control lever. The hub means is preferably made up of two hollow members, each of which members being slotted to accommodate the spider arms of the adjustable means extending from the hollow opening in the hub and to apply pressure on the friction elements carried by the particular members. One such adjustable means is provided for varying the degree of frictional engagement of one lever such as the throttle lever of an engine control assembly and a second and independent adjustable means more or less concentric with the first adjustable means and extending through the slots of the other hub member for connection with the frictional elements on that hub member and for varying the degree of frictional engagement of these friction elements with the control levers thereon.

There are disclosed herein two forms of the invention, both having separate adjustable means

2 for the different control levers, but one of the forms having one of its adjustable means so arranged that it cannot be adjusted in flight. This latter form is, in many instances, more often preferred for the less skilled pilots, than the form having both adjustable means adaptable for adjustment in flight.

For other objects and for a better understanding of the invention, reference may be had to the following detail description taken in connection with the accompanying drawing, in which Fig. 1 is an end view in elevation of the control quadrant assembly embodying the features of the present invention.

Fig. 2 is a side view in elevation of the same control quadrant assembly.

Fig. 3 is an enlarged sectional view in elevation of a part of the quadrant assembly, taken along the line 3—3 of Fig. 2.

Fig. 4 is a sectional view taken along the line 4—4 of Fig. 3.

Fig. 5 is a sectional view, taken in a similar plane as Fig. 3 is taken, of a modified form of the invention.

Fig. 6 is a sectional view taken along the line 6—6 of Fig. 5.

Referring now particularly to Figs. 1 and 2, there is shown bulkhead members 10, 11, 12 retained in a spaced apart position for spacing elements 13 and 14 which are maintained in alignment, by screw bolt 15. This assembly also includes a hub means 16 on which is pivotally mounted control levers 17, 18, and 19. With a control assembly particularly adaptable for the control of an engine of an aircraft, the lever 17 is used for the control of the throttle while the levers 18 and 19 respectively control the mixture and the pitch of the propeller. Each of these levers has a depending projection 20 adapted to serve for the connection of the lever with control rods leading from the engine.

Referring now particularly to Fig. 3, it will be noted that the hub means 16 includes two hub members 22 and 23 of hollow construction. The hub member 22 has in one of its end portions, a series of slots 24, through which extends arms of a spider element 25. The throttle lever 17 on this hub member 22 is of slightly a different construction than the levers in the hub member 23. It is hollow in order to contain wires forming a part of the radio system and adapted to extend into a handle 26 having a push button 27 for making and breaking the contact of wires leading thereto. This arrangement of wires for the radio system in the aircraft is common and is not a part of the present invention, and therefore, further description of the same is believed unnecessary.

Associated with the lever 17 and on opposite sides thereof, are friction elements 28 and 29. Spacing elements 30 are also provided on the hub member. The arms of the spider 25 externally of slots 24 engage a friction element 29 adjacent one of the spacing members 30. The friction elements 28 and 29 are retained against rotation by projection 28' and 29' extending over the spacer 13.

Threaded into the opposite end of the hub member 22 is a screw plug 32 which carries a threaded bolt 33. This bolt 33, after being threaded into the plug 32, is retained by a cotter pin 34 which is extended through the plug prior to its assembly into the hub member 22. Slidable upon the bolt 33 is a sleeve 35 engageable with the spider 25 which is also slidable on the bolt 33. The opposite end of the bolt 33 has a threaded portion 36 on which is threadingly connected an adjustable knob 37 which engages with sleeve 35 and which is retained against being backed off the bolt by a nut 38 and a cotter pin 38'. As the knob 37 is adjusted to the right, inward movement will be imparted to the sleeve 35 and to the spider 25 which, in turn, will impart movement of the spacers 30 and the friction elements 28 and 29 so that the frictional engagement of the friction elements with the control lever 17 is increased.

The middle bulkhead 11 has a hub portion 40 on which the hub member 23 is threadingly contained. This hub member 23 has the levers 18 and 19 pivotally carried on it and they have friction elements 41 and 42 respectively engaging with them. Also provided on the hub member 23 are spacing elements 43 and 44 for retaining the levers in proper spaced locations on the hub member 23. The spacing element 43 abuts the middle bulkhead 11. The bulkhead 12 is located at the opposite end of the hub member 23 but in such spaced relation as to permit the extension of spider arms 45 through slots 46 for engagement with a frictional element 42. Threaded in the bulkhead 12 is a hollow plug 47 having notches 48 (see particularly Fig. 4) thereon adapted to be engaged by a special tool for the purpose of moving the plug 47 in and out to alter the position of the spider arms 45 and to increase or lessen the frictional engagement of the friction elements 41 and 42 upon the levers 18 and 19. Once the plug 47 has been adjusted to its proper position, it is retained against becoming unthreaded by a key 49 extending into one of the notches 48 and retained on the bulkhead 12 by a threaded screw 50. The plug 47 is arranged concentrically with the sleeve 35 thereof and has independent movement with respect thereto. The adjustment of the plug 47 is usually done while the airplane is on the ground. The plug is shielded on the control assembly by a covering plat 51. It should now be apparent that there has been provided an arrangement wherein the lever 17 may be independently adjusted for different frictional engagement when the levers 18 and 19 are adjusted.

The modified form of the invention as shown in Fig. 5 has both of the adjustable means accessible for adjustment while the airplane is in flight. The hub means is of slightly different construction than the hub means shown in Fig. 3. By utilizing the hub means of Fig. 5, the use of interchangeable bulkheads 10 and 11 is made possible. The hub means 16 similarly includes two hub members 55 and 56, but they are so constructed that they telescope with each other. Each of the hub members has end slots 57 and 58 respectively. The hub member 55 is telescoped into the hub member 56 so as to leave space for the extension through the slots 57 of the spider arms 60. The spider arm 60 is operated by a sleeve 61 and a knob 62.

On the sleeve 61 is a second knob 63 threaded into a threaded plug 64. This threaded plug 64 is, in turn, carried on the slotted end of the hub member 56. Hub 56 is held against rotation with respect to the bulkhead 12 by a key 65. A washer element 66 is carried on the face of the bulkhead 12, and is held against rotation with respect to the bulkhead 12 by the same key 65. A screw 67 locks the plug 64 to the washer 66.

When it is desired to effect adjustment of the friction elements associated with the levers 18 and 19 on the hub member 56, the adjusting knob 63 is turned in the plug 64 so that adjustment of a spider 68 is made along the sleeve 61. Backing up this spider 68, and in contact with the adjusting knob 63, is a washer 69. The spider extends outwardly through the slots 58 for engagement with friction elements 42. It should thus be noted that the knob 63 is at all times accessible whereby the control levers 18 and 19 can be adjusted in flight as well as can be the lever 17 by means of the knob 62.

While various changes may be made in the detail construction, it shall be understood that such changes shall be within the spirit and scope of the present invention as defined by the appended claims.

We claim as our invention:

1. In a control quadrant assembly, a supporting frame including a plurality of bulkheads spaced apart, hollow hub means extending through the bulkheads, said hub means having slots therethrough, a pair of control levers pivoted on the hub means for independent movement with respect thereto, friction elements on the hub means adapted respectively for frictional engagement with the control levers, adjustable means for varying the degree of frictional engagement of the friction element associated with one of the control levers, said adjustable means extending into the hollow hub and through at least one of the slots thereof for engagement with the friction element, a second adjustable means concentric with the first mentioned adjustable means extending through another slot for varying the degree of frictional engagement of the friction element with the other control lever, and said second adjustable means thereby being operable independently of the first mentioned adjustable means.

2. In a control quadrant assembly, a supporting frame including a plurality of bulkheads, a pair of hollow hub members carried by the bulkheads, each of said hub members having a slotted end portion, the slotted end portion of one of the hub members partially telescoped into the other hub member, a control lever pivotally carried by each of the hub members, friction elements on the respective hub members and respectively in frictional engagement with the control levers, adjustable means extending through the slotted portion of one of the hub members for varying the degree of frictional engagement of the friction element with the control lever thereon, and a second adjustable means, independent of the first adjustable means, extending through the slotted portion of the other hub member for varying the degree of frictional engagement of the friction element with the control lever thereon.

3. In a control quadrant assembly, a supporting frame including a plurality of bulkheads, a pair of hollow hub members carried by the bulkheads, one of the hub members having a slotted end portion partially telescoping with the other hub member, the other hub member having also a slotted portion, control levers respectively carried by the hub members, friction elements respectively carried by the hub members and respectively arranged thereon in frictional engagement with the control levers, adjustable means extending through the slotted end portion of one of the hub members for varying the degree of frictional engagement of the friction element with the control lever thereon, and a second adjustable means concentrically arranged with the first mentioned adjustable means, independently operable with respect thereto and extending through the slotted portion of the other hub member, for varying the degree of friction engagement of the friction element with the control lever on the other hub member.

4. In a control quadrant assembly, a supporting frame including three bulkheads spaced apart, hollow hub means carried by the bulkheads, a control lever pivotally carried on the hub means between one pair of bulkheads, two other control levers on the hub means between another pair of bulkheads, friction elements respectively arranged on the hub means for frictional engagement with the respective control levers, said hub means being slotted at two locations therealong, adjustable means extending from one side of the frame and through the slot at one location for varying the degree of frictional engagement of the friction element with the one control lever, independently of the other two control levers, and adjustable means extending from the side of the supporting frame and through the slot at the second location for simultaneously varying the degree of frictional engagement of the friction elements engaging the other two control levers.

5. An assembly of the character described including a plurality of control levers, a frame in which said levers are angularly and independently adjustable about a common axis, a shaft carried by said frame and having an axis coincident with said first mentioned axis, a sleeve on said shaft, means responsive to the movement of said sleeve for frictionally resisting the angular movement of one of said levers, an element through which said sleeve extends and which is adjustable independently, and axially, of said sleeve, means responsive to the axial movement of said element for frictionally resisting the angular movement of another of said levers, and means independent of said element for adjusting the sleeve axially upon said shaft.

6. An assembly of the character described including a plurality of control levers, a hub about which said levers are angularly and independently adjustable, coaxial elements mounted for axial movement relative to and at least one of which extends into said hub, means responsive to the axial movement of one of said elements for frictionally resisting the angular movement of one of said levers, means responsive to the axial movement of another of said elements for frictionally resisting the angular movement of another of said levers, adjusting means at one end of the hub for moving the first mentioned element axially of the hub, and other adjusting means at said end of the hub for moving the second mentioned element axially of hub independently of the first mentioned adjusting means.

7. An assembly of the character described including a plurality of control levers, a hub about which said levers are angularly and independently adjustable, a shaft extending into said hub, an axially adjustable sleeve on said shaft, means responsive to the axial movement of said sleeve for frictionally resisting the angular movement of one of said levers, an element through which said shaft and sleeve extend and which is adjustable independently and axially of said sleeve, and means which is responsive to the axial movement of said element for frictionally resisting the angular movement of another of said levers.

8. An assembly of the character described including a plurality of control levers, a hub about which said levers are angularly and independently adjustable, a shaft extending into said hub, an axially adjustable sleeve on said shaft, means responsive to the axial movement of said sleeve for frictionally resisting the angular movement of one of said levers, an element through which said shaft and sleeve extend and which is adjustable independently and axially of said sleeve, and means which is responsive to the axial movement of said element for frictionally resisting the angular movement of a plurality of other of said levers.

9. An assembly of the character described including a hub a plurality of control levers which are angularly and independently adjustable upon said hub about a common axis, elements which frictionally engage said levers, telescoped elements which are independently adjustable relative to the hub along said axis, resilient means for cooperating with certain of said first mentioned elements and responsive to the movement of one of said last mentioned elements for predetermining the resistance offered to the angular movement of one of said levers, and resilient means for cooperating with other of said first mentioned elements and responsive to the movement of another of said last mentioned elements for predetermining the resistance offered to the angular movement of another of said levers.

10. An assembly of the character described including a plurality of control levers, a hub about which said levers are angularly and independently adjustable, discs which frictionally engage said levers, resilient means acting upon said discs, and telescoped elements which are independently and axially adjustable relative to the hub from one end of the latter, one of said elements acting upon one of said resilient means to predetermine the resistance which certain of said discs offer to the angular movement of one of said levers and another of said elements acting upon another of said resilient means to predetermine the resistance which other of said discs offer to the angular movement of another of said levers.

11. An assembly of the character described including a plurality of control levers, a hub about which said levers are angularly and independently adjustable, discs which frictionally engage said levers, resilient means which act upon said discs, a shaft extending into said hub, a sleeve which is adjustable axially of said shaft and which acts upon one of said resilient means to predetermine the resistance which certain of said discs offer to the angular movement of one of said levers, and an element through which said shaft and sleeve extend, said element being independently and axially adjustable with respect to said sleeve and acting upon another of said resilient means to predetermine the resistance which other of said discs offer to the angular movements of two other of said levers.

12. In combination, a pair of rock levers, a common pivotal mounting for said levers, means for applying frictional resistance to the rocking of one of said levers, and a second means for applying frictional resistance to the rocking of the other of said levers, one of said means being disposed concentrically of and slidable interiorly of the other means, the endwise position of one lever remaining constant upon adjustment of the other lever, said first and second means projecting from one end of said mounting, and adjustable from a position adjacent said one end of said mounting.

13. In combination, a pair of rock levers, a common pivot for said levers, means for applying frictional resistance to the rocking of one of said levers, and a second means for applying frictional resistance to the rocking of the other of said levers, said second means being so constructed and arranged that the resistance on the other lever may be varied from the resistance on said one lever, and said second means including a stationary part between said levers, and means holding said stationary part against axial and rotary movement, said first and second means being positioned at one end of said pivot, and one of said latter means extending concentrically through the other of said latter means.

14. An assembly of the character described including a hub, a plurality of control levers mounted upon said hub and which are angularly and independently adjustable about a common axis, telescoped elements which are independently adjustable relative to said hub along said axis, means responsive to the axial movement of one of said elements for frictionally resisting the angular movement of one of said levers, and means responsive to the axial movement of another of said elements for frictionally resisting the angular movement of another of said levers.

PAUL C. KORODI.
WILLIAM P. McKINNIE.